United States Patent [19]

Katagi

[11] 3,903,506

[45] Sept. 2, 1975

[54] QUASI-CONSTANT RATE VECTOR GENERATOR

[75] Inventor: Kazuo Katagi, Woodland Hills, Calif.

[73] Assignee: RCA Corporation, New York, N.Y.

[22] Filed: Nov. 12, 1973

[31] Appl. No.: 415,164

[52] U.S. Cl........ 340/347 DA, 235/150.51, 328/127

[51] Int. Cl..................................... H03k 13/02

[58] Field of Search...... 340/347 DA; 235/150.51, 235/150.52, 150.53; 328/127

[56] References Cited

UNITED STATES PATENTS

| | | | |
|---|---|---|---|
| 3,633,004 | 1/1972 | James et al. | 235/150.51 |
| 3,737,892 | 6/1973 | Dorey | 340/347 NT |
| 3,388,241 | 6/1968 | Isaacs | 235/168 |
| 3,793,589 | 2/1974 | Puckette | 325/137 |
| 3,621,228 | 11/1971 | Perlman | 235/197 |
| 3,633,043 | 1/1972 | Anthony | 307/230 |
| 3,646,549 | 2/1972 | Bryden | 340/342 DA |
| 3,564,535 | 2/1971 | Ward et al. | 340/347 |
| 3,413,453 | 11/1968 | Thorpe | 235/150.53 |

*Primary Examiner*—Charles E. Atkinson
*Assistant Examiner*—Vincent J. Sunderdick
*Attorney, Agent, or Firm*—Edward J. Norton, Carl M. Wright

[57] ABSTRACT

Circuit for adjusting vector parameters to produce vectors at a substantially constant slew rate. The adjustment is made by normalizing digital manifestations of the vector length, adjusting the sweep time depending on the number of multiplications required for normalization, and attenuating the analog voltage converted from the digital manifestation to correct for perturbations resulting from unit variations less than a unit magnitude.

5 Claims, 3 Drawing Figures

QUASI-CONSTANT RATE VECTOR GENERATOR

BACKGROUND OF THE INVENTION

Display devices for producing characters, pictorial data, drawings, or graphs from binary data such as the output information from a computer, use vector generating circuits. The vectors should be generated at a substantially uniform rate in media such as cathode ray tube displays so that the display line intensity is uniform, or nearly so, independent of the vectors' lengths.

The digital information presented to the display device can be computed to correct for variations in slew rate of different length vectors. Computing corrected information, however, requires additional processing time and the corrections required may vary from one display device to another.

Vectors can be defined in several ways. The simplest is to specify the coordinates of the terminal points of the vector. The length of the vector in each component direction can be determined by subtracting the respective coordinate values. The vectors can also be specified by the coordinates of one terminal and the component lengths.

It is economically desirable to use simple circuits for generating sweep voltages to position the display indicium. Such circuits become quite complicated when designed to maintain constant slew rates.

It is also desirable to use sweep circuits that operate at a fast rate to take advantage of the full bandwidth of the display system.

BRIEF DESCRIPTION OF THE INVENTION

According to the invention, an input register stores the parameters of a vector and is arranged to shift the parameters to more significant positions. Sweep circuit timing depends on the amount of shifting required to normalize the parameters. Attenuators adjust the values of the parameters after shifting to compensate for variations in unit values.

DETAILED DESCRIPTION OF THE INVENTION

Figure 1:
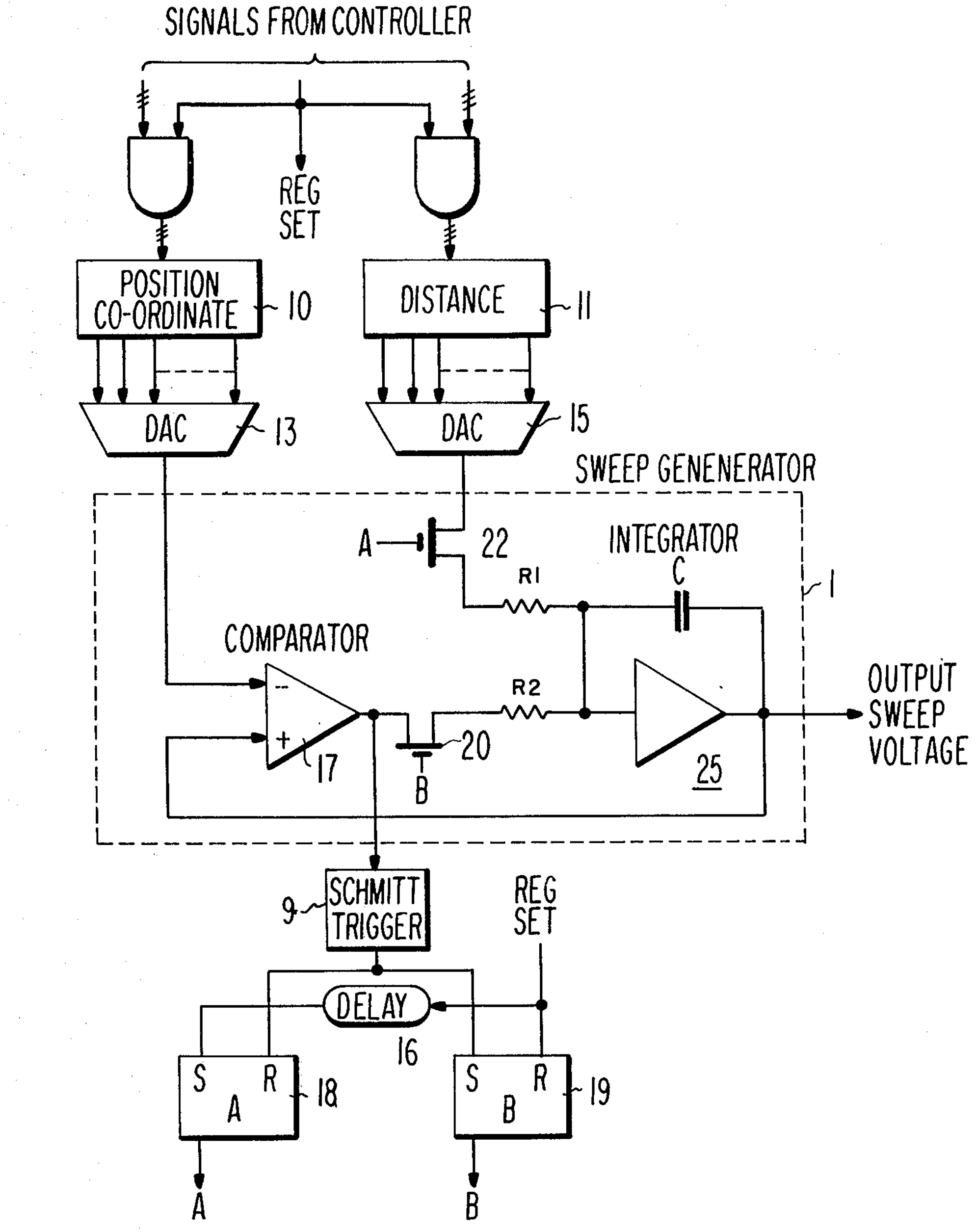
FIG. 1 is a block diagram illustrating a sweep circuit useful in the invention.

FIG. 1 shows a circuit to illustrate the operation of a single sweep circuit for one vector component.

A binary digital input register 10 stores signals representing a position coordinate that corresponds to the end position of the vector to be generated.

Another binary digital register 11 stores signals representing the length of the vector in the coordinate direction. For example, the abscissa of a vector between $x_1$ and $x_2$ has a length of $\Delta x$ $(=x_2-x_1)$. The value of $x_2$ is stored in the register 10 and the value of $\Delta x$ is stored in the register 11.

The signals to be stored in the registers are provided by a controller, the description of which is not necessary for an understanding of the invention. Such controllers are well known in the art. The signals are gated into the registers by a signal that also originates in the controller.

The output signals of the registers are converted from digital values to analog values by the digital-to-analog converters (DAC) 13 and 15. The analog signal from the DAC 13 is coupled to a comparator 17, which is shown as differential operational amplifier without feedback. The other input signal to the comparator 17 is the output sweep voltage from an integrator 25. The position coordinate signal is coupled to the inverting input terminal of the comparator 17 and the output sweep voltage, to the noninverting input terminal.

The output signal of the comparator 17 is coupled to a switch 20 and to the input terminal of a Schmitt Trigger 9.

The switch 20 and a switch 22 are shown as insulated gate field effect transistors (IGFET) but other implementations, such as relays, optical couplers, bipolar transistors, and the like, would be obvious to one of ordinary skill in the art.

When the switch 20 is closed, the output of the comparator is coupled to one input resistor, $R_2$, of an integrator 25. The output signal of the DAC 15 is coupled to the other input resistor, $R_1$, of the integrator 25 when the switch 22 is closed.

The integrator 25 is well known in the art. The output voltage $(e_o)$ of an integrator is given by $$e_o=-k\int_0^t e_i dt$$

where $e_i$ is the input voltage and $k$ is a constant determined by the circuits parameters. When the input voltage to an integrator is a step function of magnitude $e_i$, the output voltage is a ramp voltage equal to $$-e_i t/R_1 C$$

where $t$ is measured in seconds; $R_1$, in ohms; and $C$, in farads.

The output of the comparator 17 is also coupled, as noted above, to the Schmitt Trigger 9. The Schmitt Trigger is well known in the art and need not be described in detail for an understanding of the invention. Briefly, a Schmitt Trigger produces an output signal having one value when the input voltage is below a given threshold value and another value when the input signal is above a given threshold value.

The output signal from the Schmitt Trigger 9 resets a flip-flop A18 and sets a flip-flop B19. The output signals from the A flip-flop 18 and the B flip-flop 19 control the switches 22 and 20, respectively. When each flip-flop is set, the corresponding switch is closed.

The B flip-flop 19 is reset by the signal from the controller that gates the input signals to the registers 10 and 11.

The signal that resets the B flip-flop 19 is delayed by a delay device 16 to set the A flip-flop 18. The delay permits the output signals from the DAC's 13 and 15 to stabilize before the sweep voltage is generated.

The operation of the circuit shown in FIG. 1 is best described by starting with the A flip-flop 18 reset and the B flip-flop 19 set. The switch 22 will be open and the switch 20, closed. The output sweep voltage from the integrator 25 is held at the value of the output signal from the DAC 13 which specifies the end position of the previous vector. If the output sweep voltage tends to change, a corresponding change in the opposite direction will occur in the output signal from the comparator 17 which is coupled to the input of the integrator 25 through the switch 20. The net effect will be to produce a change in the output sweep voltage in a direction opposite to the change to maintain a value equal to the output voltage of the DAC 13. The output sweep voltage is negative but it is inverted by subsequent deflection amplifiers.

When the next coordinate positions are gated into the registers 10 and 11, the B flip-flop 19 will be reset opening switch 20. Both inputs of the integrator 25 will be floating so that the output signal of the integrator 25 will remain constant. Any change in the integrator output voltage will cause a feedback voltage through the capacitor *C* of an opposite polarity to counteract the output voltage change.

After a short delay, the flip-flop A18 will be set, closing the switch 22. The output sweep voltage from the integrator 25 will change at a slew rate dependent on the output voltage signal from the DAC 15 and the value of $R_1C$. When the output sweep voltage has reached the end of the vector, the comparator 17 will sense the equality of the output sweep voltage and the position coordinate voltage to activate the Schmitt Trigger 9.

The output signal from the Schmitt Trigger 9 will reset the A flip-flop 18 opening the switch 22 and will set the B flip-flop 19 closing the switch 20. The output sweep voltage will be held at the position indicated by the position coordinate register. When the next coordinate values are gated in, the above sequence of operations will be repeated.

Since the output sweep voltage is held at the terminal position coordinate, there will be no transients between successive vectors caused by charging the capacitor and the speed of the vector generation can be increased because the integrator capacitor need not be reset or preset between vectors.

The output signal from the Schmitt Trigger 9 can be replaced by a pulse from the controller having a period of *T* seconds. The minimum period *T* is determined by the deflection circuit bandwidth and is most conveniently the length of time required to draw a vector of maximum length. The product $R_1C$ should be equal to *T* for unity gain.

The slewing rate of the sweep generator 1 in FIG. 1 is proportional to the product $R_1C$. If the output voltage of the DAC 15 is designated $e_i$, then the output voltage of the integrator 25 is $-e_it/R_1C$ or $e_it/T$, where the minus sign is removed because of inversion in the deflection drive circuits. The slew rate $(de_o/dt)$ is $e_i/T$.

The output voltage, $e_0$, of the integrator 25 should approach the value of $e_i$ plus the starting point voltage of the vector. For purposes of discussion, however, the output voltage of the integrator will be discussed in terms of approaching $e_i$ as though the vector originated at the origin. Therefore, at the end of the vector, *t* will equal *T* so that the output voltage is simply $e_i$.

Since all vectors require time *T* regardless of length, the system is less efficient than one in which the amount of time to draw a vector is proportional to its length. The slewing rate, however, must be kept constant or substantially so; otherwise, the intensity will vary in inverse proportion to the vector length. For example, a short vector will have a much greater intensity because the beam moves a shorter distance during the time period *T*; that is, the beam appears to be at a given point for a longer period.

Figure 2:
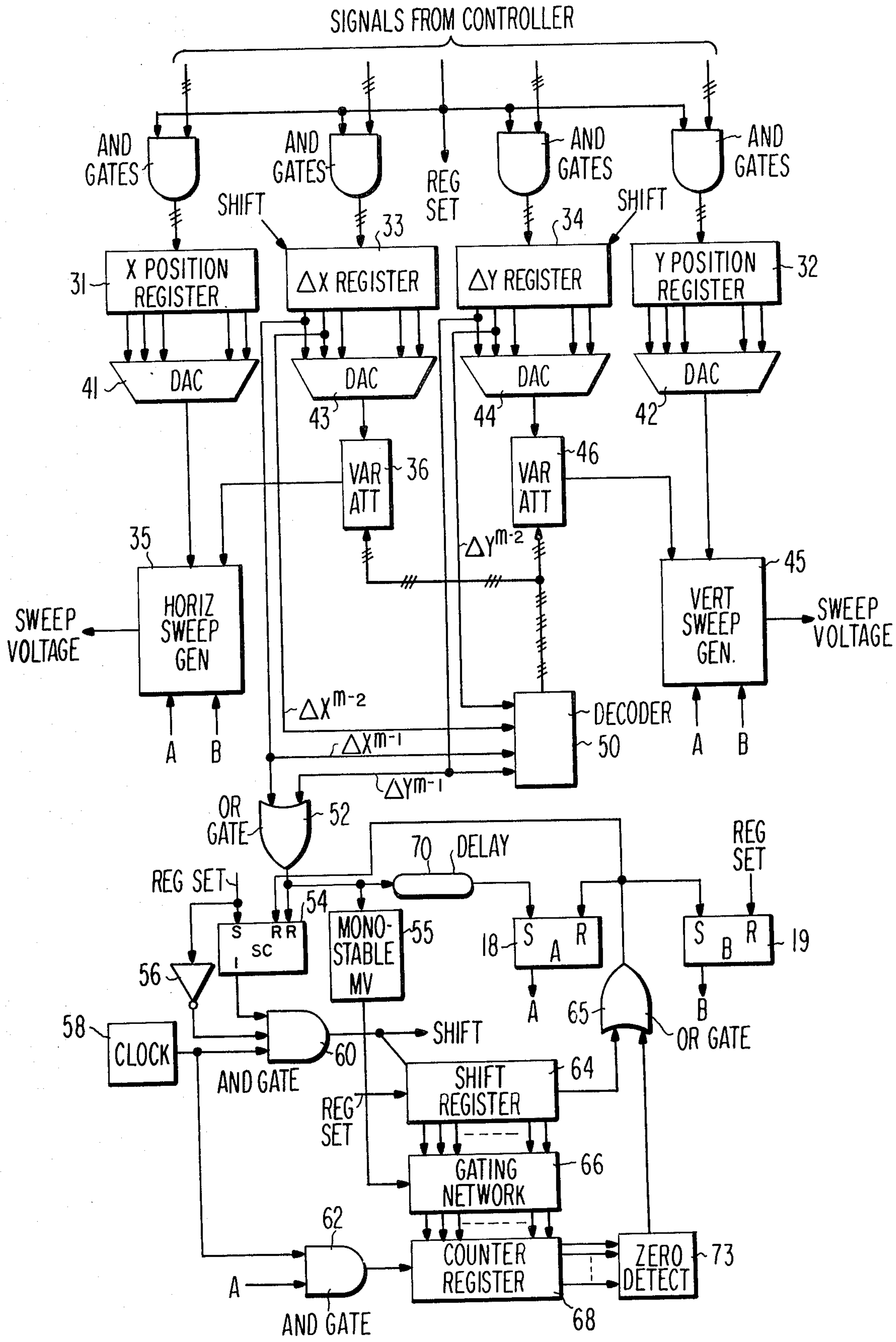
FIG. 2 is an illustration of an embodiment of the invention.

FIG. 2 illustrates an embodiment of the invention wherein the vector intensity is maintained substantially uniform and the time required to generate a vector is approximately proportional to its length.

The terminal position of the vector to be generated is stored in the X position register 31 and the Y position register 32. The X component of the vector length is stored in the ΔX register 33 and the Y component, in the ΔY register 34. As described in connection with FIG. 1, the values stored in the registers originate in a controller and are gated into the registers at an appropriate time.

The ΔX register 33 and the ΔY register 34 are implemented as shift registers. All four input registers 31–34 are coupled to individual DAC's 41–44.

The output voltage from the DAC 41 is coupled to a horizontal sweep generator 35 and the output voltage of the DAC 42 is coupled to a vertical sweep generator 45. Both sweep generators 35 and 45 can be implemented as the sweep generator 1 shown in FIG. 1.

The output voltages from the DAC's 43 and 44 are coupled to the horizontal sweep generator 35 and vertical sweep generator 45 through variable attenuators 36 and 46, respectively.

The variable attenuators 36 and 46 are controlled by a decoder 50 which is illustrated as responsive to the two most significant bits (MSB and MSB−1) of the ΔX register 33 ($\Delta X^{m-1}$ and $\Delta X^{m-2}$) and the two most significant bits of the ΔY register 34 ($\Delta Y^{m-1}$ and $\Delta Y^{m-2}$). The ΔX and ΔY registers 33 and 34 each have *m* stages.

The most significant bits (MSB) of the ΔX register 33 and the ΔY register 34 are coupled as input signals to an OR gate 52 whose output signal resets an SC (Shift Control) flip-flop 54.

The signal (REG SET) that sets the data into the input registers 31–34 sets the SC flip-flop 54 and resets the B flip-flop 19. The signal REG SET also sets the first (most significant) stage and resets the other stages of a shift register 64.

The output signal of a clock 58, having a frequency of $2^m/T$, provides an input signal to the AND gates 60 and 62. Another input of the AND gate 60 is the set output signal from the SC flip-flop 54. The REG SET signal is inverted by an inverter 56 and coupled to the AND gate 60.

The output signal of the AND gate 60 is a sequence of pulses at the clock frequency while the SC flip-flop 54 is set. The output signal of the AND gate 60 shifts the contents of the ΔX and ΔY registers 33 and 34 to the left or, in other words, from the less significant to the more significant stages. The same signal shifts the contents of the shift register 64 from the more significant to the less significant stages. The shift register 64 and counter register 68 have $m+1$ stages.

Shifting of the contents of the ΔX and ΔY registers 33 and 34 and the shift register 64 continues until a binary one signal is in the most significant stage of at least one of the ΔX or ΔY registers. When a one is shifted into a most significant stage of either a ΔX or ΔY register, the OR gate 52 is activated, resetting the SC flip-flop 54. The output signal of the OR gate 52 activates through a monostable multivibrator 55 a gating network 66 that transfers the contents of the shift register 64 to a counter register 68.

The output of the least significant stage of the shift register 64 is coupled to an OR gate 65 to reset the logic elements to an initial condition in the event that the X and Y registers 33 and 34 were both set to zero. Alternatively, a zero condition could be used to set the counter 68 to a value of one to write a dot.

The output signal of the OR gate 52 also sets the A flip-flop 18 after being delayed a short period in the delay device 70. In a manner described for the circuit of FIG. 1, the output signal from the A flip-flop 18 causes the sweep generators 35 and 45 to produce output sweep voltages. The output signal of A flip-flop 18 also enables the AND gate 62, the output signals of which are pulses at the clock frequency which cause the counter register 68 to count down by a value of one for each pulse.

The output signals of the counter register 68 are coupled to zero detector 73 which produces an output signal to reset the A flip-flop 18 and set the B flip-flop 19 via the OR gate 65 when the counter register 68 contents are zero.

The operation of the apparatus shown in FIG. 2 is best explained by assuming that the B flip-flop 19 is set, the A flip-flop 18 is reset, and SC flip-flop 54 is reset. As described in connection with FIG. 1, the output sweep voltages are clamped by the B output signal to a value equal to the output voltage of the X position register 31 and the Y position register 32, respectively. When the controller transmits a new set of vector coordinates, the input gating signal (REG SET) gates the information into the input registers 31–34, resets the B flip-flop 19, sets the SC flip-flop 54, inhibits the AND gate 60, sets the most significant stage and resets the other stages of the shift register 64. At the end of the REG SET pulse, the inhibit is removed from the AND gate 60.

If the most significant digit of either the ΔX register 33 or the ΔY register 34 were set, the SC flip-flop would be held reset. If neither register had a most significant bit of one, the end of the REG SET pulse would enable the AND gate to produce shift signals, shifting the contents of the ΔX and ΔY registers 33 and 34 and the shift register 64.

The shifting continues until the most significant bit of the ΔX register 33 or ΔY register 34 is a binary one. Then, through the OR gate 52, the SC flip-flop 54 will be reset, inhibiting the AND gate 60.

The output signal of the OR gate 52 also causes the contents of the shift register 64 to be gated via the gating network 66 to the counter register 68.

The delay device 70 delays the output signal of the OR gate 52 a short period of time to permit the contents of the counter register 68 to stabilize before the A flip-flop 18 is set by the output signal of the OR gate 52.

Setting the A flip-flop 18 causes the sweep voltages to be generated and enables the AND gate 62. The output signals of the AND gate 62 are clock pulses that count down, i.e., decrement by one, the contents of the counter register 68 until the counter register 68 contents are zero. The zero detector 73 responds to the all zero condition of the counter register 68 to set the B flip-flop 19 and reset the A flip-flop 18.

The above sequence of operation occurs for every vector to be drawn.

The operation of the counter register 68 in conjunction with the clock pulses causes the sweep generators 35 and 45 to integrate the input signal for a period equal to $T/2^n$, where $n$ is the number of stages shifted in the ΔX and ΔY registers 33 and 34 and in the shift register 64. The contents of the ΔX and ΔY registers 33 and 34 have been multiplied by a factor of $2^n$ as a result of the shifting operation.

As noted above, the output voltage of the sweep generators are $e_i t_i/T$. If $e_{\Delta X}$ and $e_{\Delta Y}$ denote the voltages from DAC's 43 and 44, respectively, before the contents of the ΔX and ΔY registers 33 and 34 are shifted, then after shifting, the output voltages from the DAC's 43 and 44 are $2^n e_{\Delta X}$ and $2^n e_{\Delta Y}$, respectively. Also, the time $t_i$ is shortened to $T/2^n$ so that the slew rate, using $e_i = 2^n e_\Delta = e_{\Delta max}$ (where $e_\Delta$ is either $e_{\Delta X}$ or $e_{\Delta Y}$), is $(2^n d_\Delta)(T/2^n)/T$, or simply $e_\Delta$. Since the slew rate with or without shifting is $e_i(e_\Delta)$, the slew rate appears to be constant for all vectors.

It will be seen, however, that $2^n$ varies in multiples of 2 whereas $e_\Delta$ varies in unit values. The variable attenuators 36 and 46 are used to adjust $2^n e_\Delta$ to a value of $e_i$ that will minimize the variations in slew rates for varying lengths of vectors. In most cases, the brightness variations caused by speed variations of $2\sqrt{2}$ to 1 are considered satisfactory.

If $e_{\Delta max}$ is the maximum value of $e_i$, then $2^n e_\Delta$ would be equal to $e_{\Delta max}$. It will not, however, always be the case that $2^n e_\Delta$ is equal to $e_{\Delta max}$. If only one stage of ΔX and ΔY registers 33 and 34 were set, then the shifting operation would result in a condition where the length of the vector to be generated would be a multiple of two so that its length would be $2^{-n}$ times its normalized value. When more than one stage in either register is set (which is the more probable condition), the output voltages of the DAC's 33 and 44 would not accurately represent a normalized value.

For example, a length of 10, 1010 in binary, would be shifted the same number of places as 8, 1000 in binary, yet both would be generated in the same amount of time, i.e., $T/2^n$.

Another way of stating the problem is that $2^n e_\Delta$ should always equal a constant so that when $e_\Delta$ varies, the value of $2^n$ should vary inversely by the same amount. Because of the binary nature of the input information, $e_\Delta$ varies by unit values whereas $2^n$ can vary only by multiples of 2. The value $e_\Delta$, therefore, can vary by an amount between $2^{m-n-1}$ and zero without changing the value of $n$.

Figure 3:
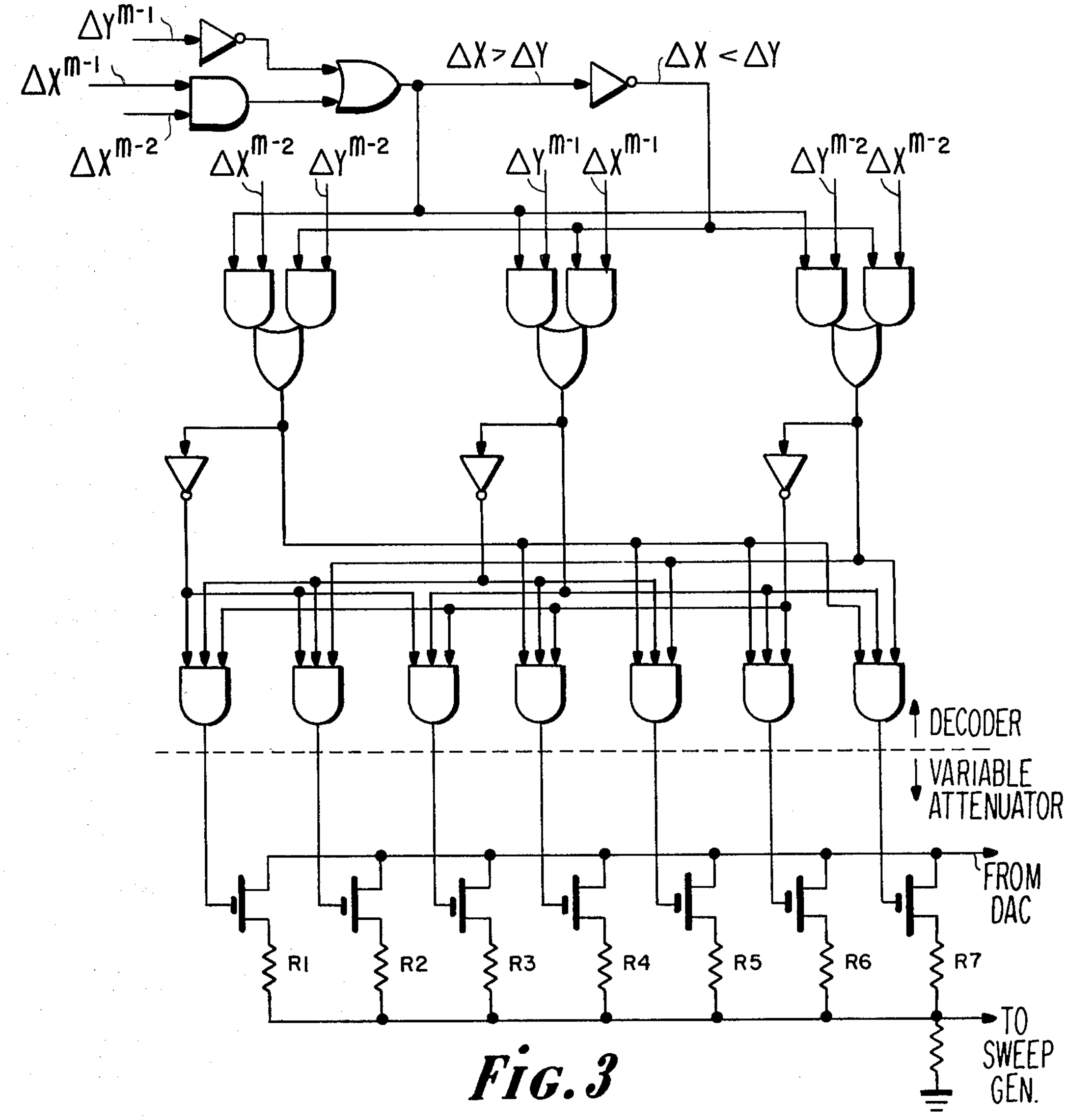
FIG. 3 is an illustration of a portion of the embodiment.

FIG. 3 illustrates one embodiment of the decoder 50 and one of the two variable attenuators 36 or 46.

The circuit shown in FIG. 3 is that used with the circuit in FIG. 2 but various modifications thereto will be evident from the description of its operation which follows.

A first level of gates produces output signals which indicate whether the normalized value of $\Delta X$ or $\Delta Y$ is greater. A next level of gates transforms the input variables which are then decoded by a third level of gates. The output of the third level of gates are coupled to switches, shown in FIG. 3 as IGFET's. Only one of the seven IGFET's is turned on by an output signal from the decoder. All the sources of the IGFET's are coupled together and coupled to the output terminal of the corresponding DAC. The drain of each IGFET is coupled via a different value resistor to the output terminal to the sweep generator. If the value of the output resistor is $R_X$, then the signal from the DAC to the sweep generator will be attenuated by a factor of $R/(R+R_X)$.

The attenuation required to minimize the slew rate deviation will first be discussed as a one-dimensional case. As noted above, $2^n e_\Delta$ must be kept constant or nearly so.

The $2^{m-1}$ (MSB) bit of $2^n e_\Delta$ will be a binary one. The value of $2^n e_\Delta$ could, however, vary from a maximum value of $2^m - 1$ (all stages 1) to a minimum of $2^{m-1}$ (all stages 0 except the MSB). A fixed attenuation factor could be used for an approximate adjustment but the ratio of the maximum to minimum slew rates would be 2, i.e., the ratio $(2^m-1)/2^{m-1}$ approaches 2 as $m$ increases.

If the $2^{m-2}$ (MSB−1) bit is considered, then the range between the maximum and minimum values can be decreased and separated into two groups. The first group is identified by an MSB−1 value of zero and the second by an MSB−1 value of one.

The first group varies from a maximum value of $2^m - 2^{m-2} - 1$ to a minimum value of $2^{m-1}$. The maximum and minimum values of the second group are $2^m - 1$ and $2^{m-1} + 2^{m-2}$, respectively.

By considering the value of MSB−1, the range of values is reduced by $2^{m-2}$ and divided into two groups. Thus, the $2^{m-2}$ bit could be used to switch between two attenuators that would compensate more closely than a single fixed value attenuator.

Extrapolating the above, a consideration of the $2^{m-2}$ and $2^{m-3}$ bits (MSB−1 and MSB−2) would divide the values into four groups, each of which would have a reduced range. Using the two bits would reduce the range by $2^{m-3}$ from that using one bit. Four attenuators could be switched, each selected by a different combination of the MSB−1 and MSB−2.

As additional bits are considered, the number of groups is doubled and the ranges of values reduced. The limiting case is to consider all the bits which would create $2^{m-1}$ groups and reduce the ranges to zero. The compensation would then be exact.

In two dimensions, the problem becomes more complicated. Both $\Delta X$ and $\Delta Y$ could be normalized separately but the time of integration would have to be adjusted to compensate for the different rates required by each sweep generator.

The approach discussed here is to shift both registers the same number of stages. The problem in two dimensions is to maintain the quantity:

$$[(2^n e_{\Delta X}/T)^2 + (2^n e_{\Delta Y}/T)^2]^{1/2}$$

constant, or substantially constant. Therefore, the quantity $(e_{\Delta X}{}^2 + e_{\Delta Y}{}^2)^{1/2}$ must vary inversely with $2^n$. Letting $e_R = (e_{\Delta X}{}^2 + e_{\Delta Y}{}^2)^{1/2}$, then the input voltage to the sweep generators is:

$$e_i = k 2^n e_\Delta$$

where $k$ is an attenuation factor that depends on the value of $e_R$ and consequently on the values of $e_{\Delta X}$ and $E_{\Delta Y}$.

A value of $k$ that will produce a constant slew rate can be selected by considering $2m-1$ bits. (There are two registers of $m$ bits but the MSB of one register is known to be one.)

For $m=3$, 26 resistors are theoretically required in the attenuators, but this can be reduced by suitable decoding of bits to use one resistor for different input conditions. (In Table I, the 0.7678R resistor can be used for two input conditions.)

Assuming that the $\Delta X$ and $\Delta Y$ registers each comprise three stages, the attenuation can be adjusted so that the slew rate (and consequently the vector intensity) will be constant by considering five of the six bits. Table I shows the values of the resistors required for such a system. Note that the multiple of $R$ is equal to one less than the normalized vector length. The attenuation factor is the inverse of the normalized vector length. The normalized vector length is the actual vector length, i.e., $(\Delta X^2 + \Delta Y^2)^{1/2}$, divided by the shortest normalized vector, i.e., 4. In general the shortest normalized vector is $2^{m-1}$.

By transforming the input variables into variables classified according to the relative magnitudes of the registers, the number of cases to be considered is reduced by half from $2^{2m}$ to $2^{2m-1}$. Because of the requirement that one group be larger than the other group, certain combinations will not occur. These combinations are equal to $\sum_{i=1}^{m} i$ which is equal to $m(m+1)/2$. Therefore, with $m$ stages in the $\Delta X$ and $\Delta Y$ registers, the number of resistors required is $2^{2m-1} - m(m+1)/2$. As $m$ increases, the resolution of the vector to be generated improves but the number of resistors required in the attenuators increases to a value which becomes economically undesirable.

Therefore, it is desirable to reduce the number of resistors in the attenuators which consequently simplified the attenuators and the decoder.

TABLE I: Three Bit Register Attenuation

| Larger Δ $2^2$ | Larger Δ $2^1$ | Larger Δ $2^0$ | Smaller Δ $2^2$ | Smaller Δ $2^1$ | Smaller Δ $2^0$ | Normalized Vector Length | Attenuation Factor | Resistor Value (XR) |
|---|---|---|---|---|---|---|---|---|
| 1 | 0 | 0 | 0 | 0 | 0 | 1.0000 | 1.0000 | 0 |
| 1 | 0 | 0 | 0 | 0 | 1 | 1.0308 | 0.9701 | 0.0308 |
| 1 | 0 | 0 | 0 | 1 | 0 | 1.1180 | 0.8944 | 0.1180 |
| 1 | 0 | 0 | 0 | 1 | 1 | 1.2500 | 0.8000 | 0.2500 |
| 1 | 0 | 0 | 1 | 0 | 0 | 1.4142 | 0.7071 | 0.4142 |
| 1 | 0 | 1 | 0 | 0 | 0 | 1.2500 | 0.8000 | 0.2500 |
| 1 | 0 | 1 | 0 | 0 | 1 | 1.2748 | 0.7845 | 0.2748 |
| 1 | 0 | 1 | 0 | 1 | 0 | 1.3463 | 0.7428 | 0.3463 |
| 1 | 0 | 1 | 0 | 1 | 1 | 1.4577 | 0.6860 | 0.4577 |
| 1 | 0 | 1 | 1 | 0 | 0 | 1.6008 | 0.6247 | 0.6008 |
| 1 | 0 | 1 | 1 | 0 | 1 | 1.7678 | 0.5657 | 0.7678 |
| 1 | 1 | 0 | 0 | 0 | 0 | 1.5000 | 0.6667 | 0.5000 |
| 1 | 1 | 0 | 0 | 0 | 1 | 1.5207 | 0.6576 | 0.5207 |

TABLE I:-Continued
Three Bit Register Attenuation

| Larger Δ | | | Smaller Δ | | | Normalized Vector Length | Attenuation Factor | Resistor Value (XR) |
|---|---|---|---|---|---|---|---|---|
| $2^2$ | $2^1$ | $2^0$ | $2^2$ | $2^1$ | $2^0$ | | | |
| 1 | 1 | 0 | 0 | 1 | 0 | 1.5811 | 0.6325 | 0.5811 |
| 1 | 1 | 0 | 0 | 1 | 1 | 1.6771 | 0.5963 | 0.6771 |
| 1 | 1 | 0 | 1 | 0 | 0 | 1.8028 | 0.5547 | 0.8028 |
| 1 | 1 | 0 | 1 | 0 | 1 | 1.9526 | 0.5121 | 0.9526 |
| 1 | 1 | 0 | 1 | 1 | 0 | 2.1213 | 0.4714 | 1.1213 |
| 1 | 1 | 1 | 0 | 0 | 0 | 1.7500 | 0.5714 | 0.7500 |
| 1 | 1 | 1 | 0 | 0 | 1 | 1.7678 | 0.5657 | 0.7678 |
| 1 | 1 | 1 | 0 | 1 | 0 | 1.8200 | 0.5494 | 0.8200 |
| 1 | 1 | 1 | 0 | 1 | 1 | 1.9039 | 0.5252 | 0.9039 |
| 1 | 1 | 1 | 1 | 0 | 0 | 2.0156 | 0.4961 | 1.0156 |
| 1 | 1 | 1 | 1 | 0 | 1 | 2.1506 | 0.4650 | 1.1506 |
| 1 | 1 | 1 | 1 | 1 | 0 | 2.3049 | 0.4339 | 1.3049 |
| 1 | 1 | 1 | 1 | 1 | 1 | 2.4749 | 0.4041 | 1.4749 |

As in the one dimensional case, an approximation of $k$ can be made using less than all the bits. A simpler circuit results at the expense of a slew rate deviation that can be negligibly small.

Table II shows the adjustment possible using one bit, viz., the MSB of the smaller register. The vector length is a normalized value based on $2^{m-1}$ as a unit length. The vector maximum is $e_R$ for the maximum values of $e_{\Delta X}$ and $e_{\Delta Y}$ divided by the normalized vector length. The vector minimum is $e_R$ for the minimum values of $e_{\Delta X}$ and $e_{\Delta Y}$ divided by the normalized vector length. The ratio is the maximum divided by the minimum and denotes the slew rate deviation range in terms of its lower value. From Table II, the maximum slew rate range is approximately 2.25 ($\approx \sqrt{5}$).

TABLE IV: Skew Rate Attenuation Resistors

| Resistor (FIG. 3) | Larger Δ | | Smaller Δ | | Vector Length | Multiple of $R$ |
|---|---|---|---|---|---|---|
| | MSB | MSB-1 | MSB | MSB-1 | | |
| R1 | 1 | 0 | 0 | 0 | 1 | 0 |
| R2 | 1 | 0 | 0 | 1 | $\sqrt{1.25}$ | 0.1180 |
| R3 | 1 | 0 | 1 | 0 | $\sqrt{2}$ | 0.4142 |
| R4 | 1 | 1 | 0 | 0 | 1.5 | 0.5000 |
| R5 | 1 | 1 | 0 | 1 | $\sqrt{2.5}$ | 0.5811 |
| R6 | 1 | 1 | 1 | 0 | $\sqrt{3.25}$ | 0.8028 |
| R7 | 1 | 1 | 1 | 1 | $\sqrt{4.5}$ | 1.1213 |

It is possible to reduce further the slew rate deviation within each group by using a different vector length. The contents of the input registers can be considered as random variables. Assume the value $z$ is a random variable bounded by $a$ (minimum vector length) and $b$ (maximum vector length) and the deviation from $p$ (normalized vector length) is given by $|p-z|$. The expected value of $|p-z|$ is:

$$\int_a^b |p-z|dz/(b-a)$$

which is a minimum for $p=(a+b)/2$.

Therefore, the deviation range within each group can be reduced by using a normalized vector length that is the average of the maximum and minimum vectors. The ratio shown in Table III will not, however change if the vector length is changed; it can only be reduced by considering more bits.

Tables II and III use maximum and minimum values based on large values of $m$. The actual attenuator values are determined by exact maximum and minimum values which depend on the actual value of $m$.

TABLE II: Slew Rate Adjustment—One Bit

| Larger | | | Smaller | | | Vector | | | |
|---|---|---|---|---|---|---|---|---|---|
| MSB | Max | Min | MSB | Max | Min | Length | Max | Min | Ratio |
| 1 | 1 | 0.5 | 0 | 0.5 | 0 | 1 | $\sqrt{1.25}$ | 0.5 | $\sqrt{5}$ |
| 1 | 1 | 0.5 | 1 | 1 | 0.5 | $\sqrt{2}$ | 1 | 0.5 | 2 |

Table III shows the improvement resulting from the use of three bits. (The MSB of the larger register is always one). The maximum ratio, i.e., maximum slew rate range, is reduced to 1.6125.

The actual maximum values also depend on $n$ because the $n$ least significant bits must be zero. The attenuation can, therefore, be corrected by also con- TABLE III: Slew Rate Adjustment—Three Bits

| Larger Δ | | | | Smaller Δ | | | | Vector | | | |
|---|---|---|---|---|---|---|---|---|---|---|---|
| MSB | MSB-1 | Max | Min | MSB | MSB-1 | Max | Min | Length | Max | Min | Ratio |
| 1 | 0 | 0.75 | 0.5 | 0 | 0 | 0.25 | 0 | 1 | 0.7906 | 0.5000 | 1.5811 |
| 1 | 0 | 0.75 | 0.5 | 0 | 1 | 0.5 | 0.25 | $\sqrt{1.25}$ | 0.8062 | 0.5000 | 1.6125 |
| 1 | 0 | 0.75 | 0.5 | 1 | 0 | 0.75 | 0.5 | $\sqrt{2}$ | 0.7500 | 0.5000 | 1.5000 |
| 1 | 1 | 1 | 0.75 | 0 | 0 | 0.25 | 0 | 1.5 | 0.6872 | 0.5000 | 1.3743 |
| 1 | 1 | 1 | 0.75 | 0 | 1 | 0.5 | 0.25 | $\sqrt{2.5}$ | 0.7071 | 0.5000 | 1.4142 |
| 1 | 1 | 1 | 0.75 | 1 | 0 | 0.75 | 0.5 | $\sqrt{3.25}$ | 0.6934 | 0.5000 | 1.3868 |
| 1 | 1 | 1 | 0.75 | 1 | 1 | 1 | 0.75 | $\sqrt{4.5}$ | 0.6668 | 0.5000 | 1.3333 |

Table IV shows the values of the resistors in FIG. 3 based on the data in Table III.

sidering the value of $n$, which is available from the position of the binary one in the shift register 64 of FIG. 2.

Figure 4:
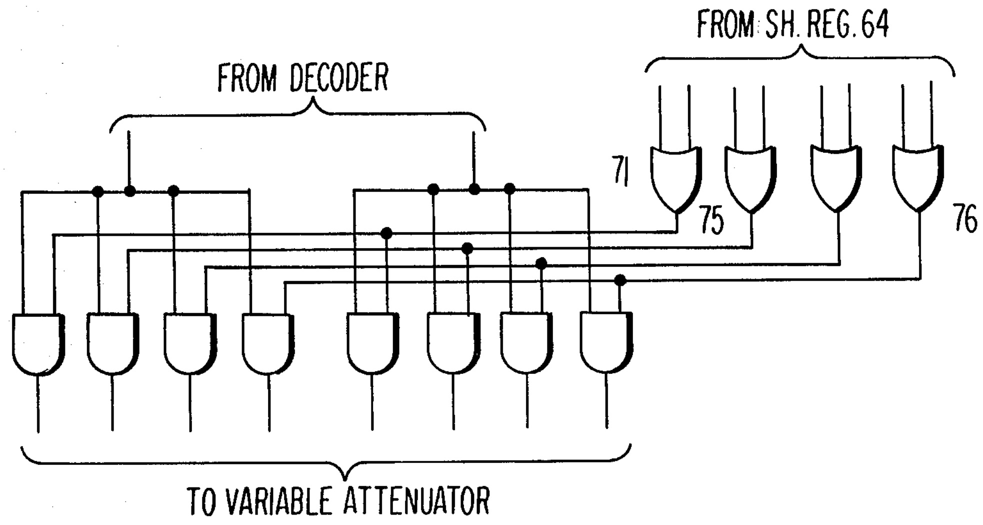
FIG. 4 is a logic diagram of a correction circuit.

The circuit in FIG. 4 is one embodiment of an additional level of gating in the decoder that will adjust the attenuation factor depending on the value of $n$.

The output signals from the shift register 64 (FIG. 2) are divided into four groups. Each group comprises adjacent bits. The most significant group bits are used as input signals to an OR gate 71. The next significant group are coupled to the next OR gate 75 and so on, with the least significant group coupled to an OR gate 76.

The decoder output signals (FIG. 3) provide another group of input signals, only two of the seven being shown in FIG. 4 for purposes of clarity. The number of lines to the variable attenuator would be multiplied by four, i.e., 28 IGFET switches and attenuator resistors would be required.

The output signals from the shift register 64 (FIG. 2) could be divided in more or fewer groups than four depending on considerations of accuracy and economy.

An exact correction cannot be made by using each separate value of $n$ because $n$ only locates least significant zeros shifted into the lower stages. Using the value of $n$ reduces only the maximum values and therefore reduces the ratio of the maximum to minimum value.

The bits from the shift register 64, which has $m+1$ stages, can be grouped using the following criteria. The bits sensed by the decoder 50 (FIG. 2) comprise the first group.

The number of remaining bits are divided by the number of remaining groups and the result integer indicates the number of bits in each successive lower group except the last, which includes all the remaining bits. The least significant bits have the least effect and therefore more can be placed into a single group.

For example, if two bits are sensed, $n$ is to be divided into four groups, and there are twelve stages in the ΔX and ΔY registers, then $m=12$ and $m+1=13$. The first group is made up of the two sensed bits and the remaining three groups are to be derived from the remaining 11 bits. Since $11/3=3.6667$, the subsequent groups will be made up of three bits each and the last group, of five bits. The first group would consist of the $2^{12}$ and $2^{11}$ bits; the second $2^{10}$, $2^9$, and $2^8$; the third group, $2^7$, $2^6$, and $2^5$; and the fourth group $2^4$, $2^3$, $2^2$, $2^1$, and $2^0$.

The maximum value of vector length within each group can be reduced by an averaged value, which is a valid procedure since the input values are random variables. The average value of a group (AVG) can be shown to be equal to $$2^r - b2^{r-1}/(2^b - 1)$$

where $r$ = highest exponent in the group, and
$b$ = number of bits in the group.

The total value of a group (TVG) is given by $$2^{r-b+1}(2^b - 1)$$

If the binary numbers in the ΔX and ΔY registers 33 and 34 are represented as $$\sum_{i=0}^{m-1} b_i 2^i,$$

where the $q$ most significant bits are sensed, then the minimum value in a register is given by $$\text{min value} = b_{m-1}\times 2^{m-1} + b_{m-2}\times 2^{m-2} + \ldots + b_{m-q}\times 2^{m-2}$$

and the maximum value by $$\text{max value} = b_{m-1}\times 2^{m-1} + b_{m-2}\times 2^{m-2} + \ldots + b_{m-q}\times 2^{m-q} + \sum_{i=0}^{m-q-1} 2^i$$

$$= \text{min value} + \sum_{i=0}^{m-q-1} 2^i$$

By using the groups as described above, the maximum values are equal to $$b_{m-1}\times 2^{m-1} + b_{m-2}\times 2^{m-2} + \ldots + b_{m-q}\times 2^{m-q} + \text{AVG}_g + \text{TVG}_g^*$$

where $\text{AVG}_g$ = average value of the group, and $\text{TVG}_g^*$ = total value of all the higher groups.

The TVG and AVG of the first group are always zero because they are included in the value of the sensed bits.

Table VI shows the values used in a system where $m=10$, the two most significant bits of each Δ register are sensed, and four groups of $n$ are used. The values of AVG and TVG are shown in Table V.

TABLE V: Four Groups; $m=10$

| Group | $r$ | $b$ | AVG | TVG |
|---|---|---|---|---|
| 1 | 9 | 2 | 0 | 0 |
| 2 | 7 | 2 | 85.3333 | 192 |
| 3 | 5 | 2 | 21.3333 | 48 |
| 4 | 3 | 4 | 6.9333 | 15 |

The vector length in Table VI is based on the smallest vector that would occur divided into the average vector, which is based on the maximum and minimum for each vector component. The multiplier of $R$ for each resistor is one less than the vector length.

Using the value of $n$, the maximum ratio is reduced to 1.5905 and the average ratio to 1.2421 from a maximum value of 1.6125 and an average value of 1.4575 when not using $n$.

TABLE VI: Four Groups; $m = 10$; 26 Resistors

| Group | Larger bm − 1 | Larger bm − 2 | Smaller bm − 1 | Smaller bm − 2 | Vector Length | Rate Min | Rate Max | Rate Ratio |
|---|---|---|---|---|---|---|---|---|
| 1 | 1 | 0 | 0 | 0 | 1 | 1 | 1 | 1 |
| | 1 | 0 | 0 | 1 | 1.1180 | 1 | 1 | 1 |
| | 1 | 0 | 1 | 0 | 1.4142 | 1 | 1 | 1 |
| | 1 | 1 | 0 | 0 | 1.5000 | 1 | 1 | 1 |
| | 1 | 1 | 0 | 1 | 1.5811 | 1 | 1 | 1 |
| | 1 | 1 | 1 | 0 | 1.8028 | 1 | 1 | 1 |
| | 1 | 1 | 1 | 1 | 2.1213 | 1 | 1 | 1 |
| 2 | 1 | 0 | 0 | 0 | 1.0865 | 0.9204 | 1.0847 | 1.1785 |
| | 1 | 0 | 0 | 1 | 1.2304 | 0.9087 | 1.0921 | 1.2019 |
| | 1 | 0 | 1 | 0 | 1.5321 | 0.9231 | 1.0769 | 1.1667 |
| | 1 | 1 | 0 | 0 | 1.5855 | 0.9461 | 1.0564 | 1.1167 |
| | 1 | 1 | 0 | 1 | 1.6874 | 0.9370 | 1.0638 | 1.1353 |
| | 1 | 1 | 1 | 0 | 1.9185 | 0.9397 | 1.0604 | 1.1285 |
| | 1 | 1 | 1 | 1 | 2.2392 | 0.9474 | 1.0526 | 1.1111 |
| 3 | 1 | 0 | 0 | 0 | 1.2262 | 0.8156 | 1.2043 | 1.4767 |
| | 1 | 0 | 0 | 1 | 1.4006 | 0.7982 | 1.2047 | 1.5092 |
| | 1 | 0 | 1 | 0 | 1.7088 | 0.8276 | 1.1724 | 1.4167 |
| | 1 | 1 | 0 | 0 | 1.7210 | 0.8716 | 1.1397 | 1.3076 |
| | 1 | 1 | 0 | 1 | 1.8494 | 0.8500 | 1.1488 | 1.3437 |
| | 1 | 1 | 1 | 1 | 2.0925 | 0.8615 | 1.1390 | 1.3221 |
| | 1 | 1 | 1 | 1 | 2.4159 | 0.8780 | 1.1220 | 1.2778 |
| 4 | 1 | 0 | 0 | 0 | 1.2644 | 0.7909 | 1.2329 | 1.5588 |
| | 1 | 0 | 0 | 1 | 1.4456 | 0.7734 | 1.2301 | 1.5905 |
| | 1 | 0 | 1 | 0 | 1.7552 | 0.8057 | 1.1943 | 1.4823 |
| | 1 | 1 | 0 | 0 | 1.7578 | 0.8534 | 1.1606 | 1.3601 |
| | 1 | 1 | 0 | 1 | 1.8923 | 0.8356 | 1.1691 | 1.3922 |
| | 1 | 1 | 1 | 0 | 2.1382 | 0.8431 | 1.1576 | 1.3730 |
| | 1 | 1 | 1 | 1 | 2.4624 | 0.8615 | 1.3385 | 1.3215 |

If, instead of using the value of $n$, five bits are sensed, then only 26 (vice 28) resistors would be required. T ble VII shows the pertinent values for 10-stage registers, sensing the three most significant bits of the $\Delta X$ and $\Delta Y$ registers. The maximum ratio is only about 1.15 and the average ratio is 1.1018 which indicates that added complexity is most efficient when used to sense additional bits in the $\Delta X$ and $\Delta Y$ registers rather than using the value of $n$.

An economical system has been described which generates vectors at a substantially constant rate from digital information using standard devices. Various modifications and changes can be made in the disclosed embodiment by persons of ordinary skill in the art within the scope of the invention as described and claimed.

TABLE VII: Five Bit Sensing; $m - 10$

| Larger bm − 1 | Larger bm − 2 | Larger bm − 3 | Smaller bm − 1 | Smaller bm − 2 | Smaller bm − 3 | Vector Length | Rate Ratio |
|---|---|---|---|---|---|---|---|
| 1 | 0 | 0 | 0 | 0 | 0 | 1.0000 | 1.1308 |
| 1 | 0 | 0 | 0 | 0 | 1 | 1.0405 | 1.1492 |
| 1 | 0 | 0 | 0 | 1 | 0 | 1.1295 | 1.1499 |
| 1 | 0 | 0 | 0 | 1 | 1 | 1.2567 | 1.1391 |
| 1 | 0 | 0 | 1 | 0 | 0 | 1.4118 | 1.1240 |
| 1 | 0 | 1 | 0 | 0 | 0 | 1.2347 | 1.1037 |
| 1 | 0 | 1 | 0 | 0 | 1 | 1.2677 | 1.1171 |
| 1 | 0 | 1 | 0 | 1 | 0 | 1.3417 | 1.1209 |
| 1 | 0 | 1 | 0 | 1 | 1 | 1.4504 | 1.1171 |
| 1 | 0 | 1 | 1 | 0 | 0 | 1.5867 | 1.1090 |
| 1 | 0 | 1 | 1 | 0 | 1 | 1.7442 | 1.0992 |
| 1 | 1 | 0 | 0 | 0 | 0 | 1.4695 | 1.0858 |
| 1 | 1 | 0 | 0 | 0 | 1 | 1.4973 | 1.0959 |
| 1 | 1 | 0 | 0 | 1 | 0 | 1.5605 | 1.1003 |
| 1 | 1 | 0 | 0 | 1 | 1 | 1.6549 | 1.0997 |
| 1 | 1 | 0 | 1 | 0 | 0 | 1.7755 | 1.0956 |
| 1 | 1 | 0 | 1 | 0 | 1 | 1.9175 | 1.0895 |
| 1 | 1 | 0 | 1 | 1 | 0 | 2.0765 | 1.0827 |
| 1 | 1 | 1 | 0 | 0 | 0 | 1.7043 | 1.0732 |
| 1 | 1 | 1 | 0 | 0 | 1 | 1.7283 | 1.0810 |
| 1 | 1 | 1 | 0 | 1 | 0 | 1.7834 | 1.0853 |
| 1 | 1 | 1 | 0 | 1 | 1 | 1.8665 | 1.0861 |
| 1 | 1 | 1 | 1 | 0 | 0 | 1.9743 | 1.0842 |
| 1 | 1 | 1 | 1 | 0 | 1 | 2.1029 | 1.0805 |
| 1 | 1 | 1 | 1 | 1 | 0 | 2.2488 | 1.0759 |
| 1 | 1 | 1 | 1 | 1 | 1 | 2.4088 | 1.0709 |

*What is claimed is:*

1. The combination comprising:

integrator means for producing an output signal having a time rate of change proportional to an input voltage;

first switch means for applying a first signal to the integrator means as the input voltage;

second switch means for applying a second signal to the integrator means as the input voltage, said second signal being proportional to the difference voltage between the output signal and a reference voltage; and control means for controlling said first and second switch means said control means being responsive to said second signal for closing said first switch and opening said second switch when said difference is one value and for opening said first switch and closing said second switch when said difference is substantially zero.

2. The combination comprising:

integrator means for producing an output signal having a time rate of change proportional to an input voltage;

first switch means for applying a first signal to the integrator means as the input voltage;

second switch means for applying a second signal to the integrator means as the input voltage, said second signal being proportional to the difference between the output signal and a reference voltage; and control means for controlling said first and second switch means said control means being responsive to a variable time interval signal whose duration is proportional to the magnitude of the first signal.

3. The invention as claimed in claim 2 further including:

means for multiplying the value of said first signal by a constant successive times until the first signal is approximately equal to a maximum value; and means responsive to the multiplying means for producing the time interval signal having a duration inversely proportional to the number of multiplications.

4. The invention as claimed in claim 3 wherein said multiplier means comprises in combination:

an input shift register for storing binary signals representative of the value of said input voltage in binary levels of one and zero;

means for shifting said signals from stage to stage effectively to multiply said value by two at each shift;

means responsive to a binary signal of one in the most significant stage of the shift register for inhibiting the shifting means; and converter means responsive to the binary signals in said shift register for producing the input voltage.

5. The invention as claimed in claim 4 including means for modifying the input voltage in response to binary values in various stages of said shift register.

* * * * *

UNITED STATES PATENT OFFICE

CERTIFICATE OF CORRECTION

PATENT NO. : 3,903,506

DATED : September 2, 1975

INVENTOR(S) : KATAGI

It is certified that error appears in the above-identified patent and that said Letters Patent are hereby corrected as shown below:

Column 6, line 33, change "$(2^n d_\Delta)$" to --$(2^n e_\Delta)$--

Column 13, line 33, change "T BLE" to --TABLE--

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*